(12) United States Patent
Wilkening

(10) Patent No.: US 7,387,340 B2
(45) Date of Patent: Jun. 17, 2008

(54) INCLINATION ADJUSTMENT DEVICE WITH FREELY PIVOTING DEVICE FOR THE BACK PART OF A MOTOR VEHICLE SEAT

(75) Inventor: Bernd Wilkening, Beckedorf (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 331 days.

(21) Appl. No.: 11/089,742

(22) Filed: Mar. 25, 2005

(65) Prior Publication Data

US 2005/0231015 A1 Oct. 20, 2005

(30) Foreign Application Priority Data

Mar. 26, 2004 (DE) ...................... 10 2004 015 234

(51) Int. Cl.
*B60N 2/02* (2006.01)
*B60N 2/48* (2006.01)
*B60N 2/00* (2006.01)

(52) U.S. Cl. .............................. 297/378.12; 297/354.12

(58) Field of Classification Search ................ 297/373, 297/374, 362, 361.1, 354.12, 378.12; 403/348
See application file for complete search history.

(56) References Cited

U.S. PATENT DOCUMENTS

| 3,902,757 | A | * | 9/1975 | Yoshimura | ................... | 297/367 |
| 4,449,737 | A | * | 5/1984 | Specht | ........................... | 285/7 |
| 6,302,617 | B1 | * | 10/2001 | Rumpp | ........................ | 403/348 |
| 6,572,196 | B1 | * | 6/2003 | Thieme et al. | ......... | 297/452.18 |
| 7,090,299 | B2 | * | 8/2006 | Lange | ......................... | 297/362 |
| 7,204,556 | B2 | * | 4/2007 | Schwerdtner et al. | .. | 297/378.12 |
| 2004/0051361 | A1 | * | 3/2004 | Rausch et al. | .............. | 297/341 |
| 2005/0211005 | A1 | * | 9/2005 | Lange | ........................... | 74/34 |

FOREIGN PATENT DOCUMENTS

| DE | 43 24 734 A1 | 1/1995 |
| DE | 197 15 764 A1 | 10/1998 |
| DE | 102 32 030 A1 | 2/2004 |

\* cited by examiner

*Primary Examiner*—David R. Dunn
*Assistant Examiner*—Kaitlin A Wilson
(74) *Attorney, Agent, or Firm*—Synnestvedt & Lechner LLP

(57) ABSTRACT

The invention relates to a device for adjusting inclination having a freely pivoting device for the back part of a motor vehicle seat, which has at least:
  an inclination adjuster (2) with a lower part (3) and an upper part (4) that can be pivoted and locked in opposite to the lower part (3),
  a pivot bearing (5) for fastening to the back part of the seat, which has an engaging means (26) for removable rotationally rigid engagement in the upper part (4) and after releasing the engagement can be folded vis-à-vis the inclination adjuster (2) within the folding range,
  an adapter (6) connected rotationally rigidly to the lower part (3) of the inclination adjuster (2) for fasting to a seat frame of the motor vehicle seat, and
  a bearing part (7) connected rotationally rigidly to the pivot bearing (5), wherein the upper part (4) is axially clamped between the pivot bearing (5) and the bearing part (7) and the pivot bearing (5) is axially clamped between the adapter (6) and the lower part (3).

According to the invention, an additional axial locking is obtained by a bayonet retaining device (36, 37, 38) formed between the pivot bearing (5) and the upper part (4).

12 Claims, 3 Drawing Sheets

INCLINATION ADJUSTMENT DEVICE WITH FREELY PIVOTING DEVICE FOR THE BACK PART OF A MOTOR VEHICLE SEAT

CROSS REFERENCE TO RELATED APPLICATIONS

This application claims the priority of German Patent Application 10 2004 015 234,9 filed on Mar. 26, 2004, the entire contents o incorporated in total by reference.

BACKGROUND OF THE INVENTION

1. Field of the Invention

The invention relates to an inclination adjustment device with a freely pivoting device for the back part of a motor vehicle seat.

2. Description of Related Art

This type of inclination adjustment device is known from DE 102 32 030 A1. A device part affixed to the seat part and a device part affixed to the back part are each fixedly connected to adapters, which partially fit around the other device part and consequently make possible an axial locking. A swash mechanism is provided for adjusting the inclination of the back part, said swash mechanism pivoting two parts of the inclination adjustment device steplessly against each other. When this is done, the adapter affixed to the back part support latches with one of the parts; after unlocking the latching a free folding of the device part affixed to the back part is possible vis-à-vis the device part affixed to the seat.

In contrast with a simple inclination adjustment, the folding movement of the back part is accordingly made possible by the further coaxial functional level of the adapter affixed to the back part; to achieve this, the axially added adapter affixed to the back part is axially secured to the inclination adjustment device. Axial retention means such as arcurate bearing points, for example, leave sufficient space for the pivot movements; that is, the inclination adjustment and the folding movement after loosening of the latching means. In virtue of this free space, however, there is the risk that in the event of overload due to the transverse forces generated in the gearing of the swash mechanism, the device parts are spread apart and the device part consequently opens.

DE 197 15 764 C2 discloses a device for adjusting inclination having a freely pivoting device, wherein an axial retaining device of the device parts affixed to the back part and to the seat frame is obtained by a covering hood and a stud. DE 43 24 734 C2 discloses a device for adjusting the inclination of a back part of seats having a hinge part affixed to the seat.

SUMMARY OF THE INVENTION

The object of the invention is to provide a inclination adjusting device having a freely pivoting device for the back part of a motor vehicle seat, which makes possible on the one hand an adjustment of the inclination within the comfort range of the back part and a folding of the back part in the freely pivoting position and on the other hand permitting an axial locking of the device in the event of transverse forces occurring in the device.

This object is achieved by a device for adjusting inclination and a method for assembling or manufacturing said type of device for adjusting inclination.

Thus according to the invention, an additional axial bayonet retaining device is provided, which forms a positive gripping around between the upper part of the device for adjusting inclination and the pivot bearing affixed to the back part. This bayonet locking device is seated advantageously centrally and in the enclosed zone and can therefore provide a considerable resistance against an opening of the device. The bayonet retaining device is formed preferably by an axially projecting bayonet ring with radially protruding bayonet springs provided on the upper part and bayonet grooves provided in the pivot bearing. Thus the bayonet springs and bayonet grooves reach into a superimposing rotary position only during assembly not, however, after joining the components, wherein the adapter is connected with the bottom part and the pivot bearing with the bearing part, because the corresponding rotary position lies outside of the pivot ranges of the folding movement and the inclination adjusting movement.

The bayonet retaining device can further serve in positioning in the assembly operation, in that it holds the pivot bearing at the time of bolting with the bearing part—which, for example, may be configured as a bearing plate.

These and other features of the invention will be more fully understood by reference to the following drawings.

DETAILED DESCRIPTION OF THE INVENTION

Figure 1:
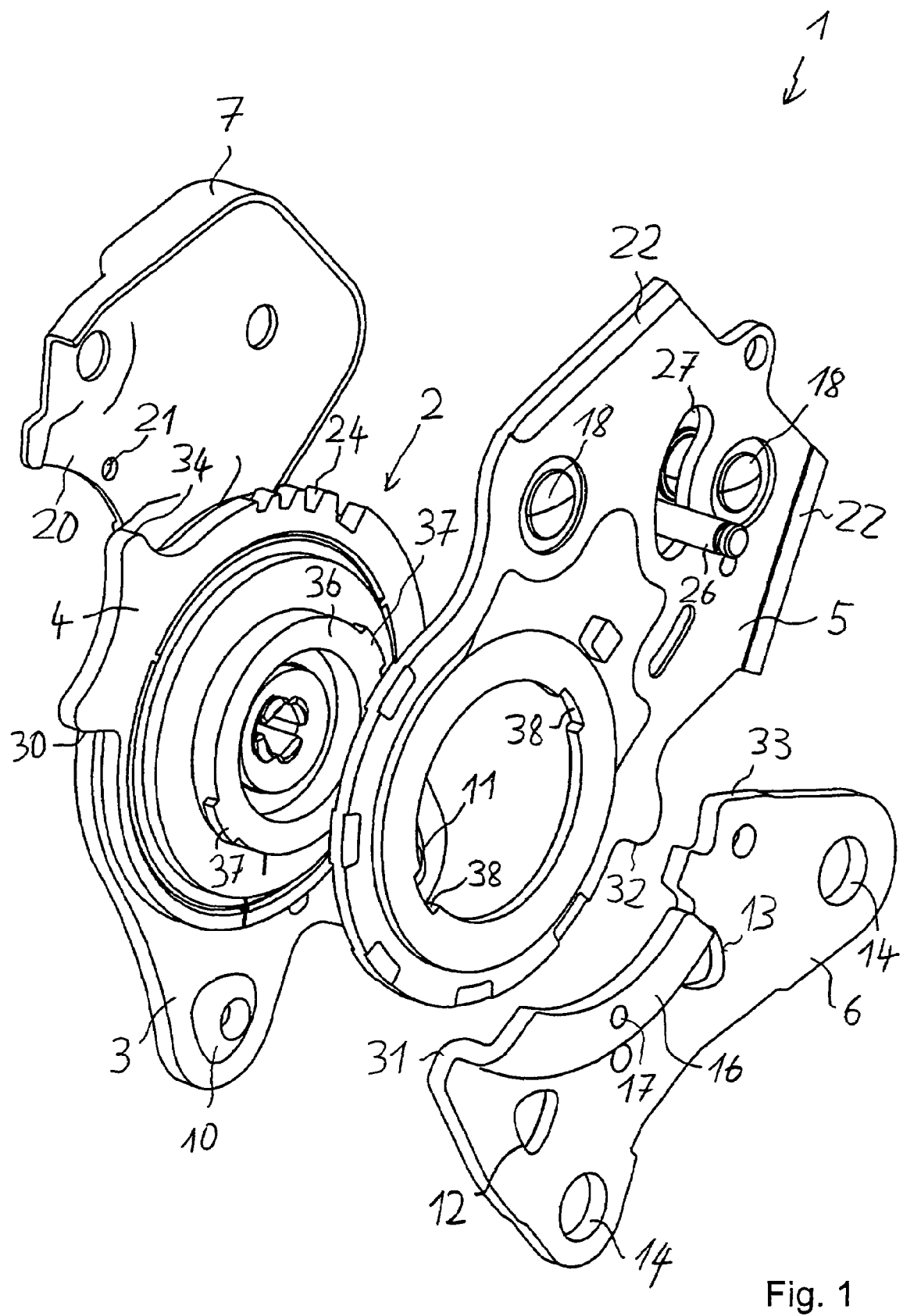
FIG. 1 represents a illustration of a device for adjusting inclination exploded axially viewed from the center of the back part outwards.

During the course of this description, like numbers will be used to identify like elements according to the different views that illustrate the invention.

A device for adjusting inclination 1 has an inclination adjuster 2 with a bottom part 3 and an upper part 4 that can be pivoted opposite to the lower part 3 within the comfort range and locked in its pivot positions, a pivot bearing 5 provided concentric to the inclination adjuster 2 on the back part pivot axis A for attachment to a back part support, an adapter 6 for axial clamping of the pivot baring 5 on the inclination adjuster 2 and for fastening to the seat frame of the motor vehicle seat and a bearing plate 7 for axial clamping of the upper part 4 of the inclination adjuster 2 on the pivot bearing 5.

Between the bottom part 3 and the adapter 6, two weld connections 8, 9 are formed in the weld zones 10, 11 of the bottom part 3 and weld zones 12, 13 of the adapter 6, whereby these to are coupled together rigidly in the rotational sense. To this end, the adapter 6 is fastened to the seat frame of the motor vehicle seat using screw holes 14 in two screw connections provided for this purpose and clamps the pivot bearing 5 with its axially protruding arcuate clamping zone 16 with clearance at the upper part 4 of the inclination adjuster 2. When this is done, a slider (not shown) made of plastic is inserted into an opening 17 of the clamping zone 16.

The bearing plate 7 is torsionally rigidly fastened to the pivot bearing 5 using bolts 18 and has a clamping zone 20 for axial clamping of the upper pan 4 to the pivot bearing 5.

When this is done, a slider (not shown) made of plastic is fastened in an opening 21 of the clamping zone 20. The adapter 6 and the bearing plate 7 consequently serve in the axial locking of the inclination adjuster 2 and the pivot bearing 5, so that these are not spread apart axially in the event of transverse forces.

The axial bearing 5 is welded in the weld zones 22 to the back pan support. The upper part 4 has on its upper side a gearing 24 for receiving a gear pawl (not shown) fastened to the pivot bearing 5 and adjustable by means of a control 26. In this instance, the control 26 is guided in an arcuate slot 27 of the pivot bearing 5, advantageously spring biased in its lower position for engagement of the gear pawl in the gearing 24 and can be adjusted upwardly for releasing using a flexible control cable, for example.

For adjusting the inclination of the back pan within a comfort zone, the gear pawl is latched into the gearing 24, such that the pivot bearing 5 is connected torsionally rigidly with the upper pan 4. By pivoting the upper pan 4 together with the pivot bearing 5 against the lower pan 3 with the torsionally rigidly attached adapter 6, the inclination of the back pan can be adjusted vis-à-vis the seat frame. The inclination adjustment zone of the inclination adjuster 2 is—as can be seen in FIG. 2, defined by the stops 30, 31 of the upper part 4 and the adapter 6 fastened to the lower pan 3. After unlatching the gear pawl using the control 26, the pivot bearing 5 can be freely folded forward with the bolted bearing plate 7 and the welded seat back support. The back pan folding range for adjusting the back part of the seat in a partially folded-forward easy-entry-position is defined by the stops 32, 33 between the adapter 6 and the pivot bearing 5. A posterior stop for the seat back folding range is formed by the bolts of the left bolts 18 of FIG. 1, 2 and a stop 34.

The inclination adjuster 2 and the pivot bearing 5 are locked complementarily by a bayonet retention device or bayonet locking device against an axial spreading apart. The bayonet retention device has an axially projecting bayonet ring 36 with two bayonet springs 37 protruding radially outwardly and to bayonet grooves 38, complementary to the bayonet springs 37, formed on the pivot bearing 5, provided on the upper part 4. The bayonet ring 36 can be fastened to the other metal sheet pressed part of the upper part 4 by a resistance weld 39, for example.

Figure 3:
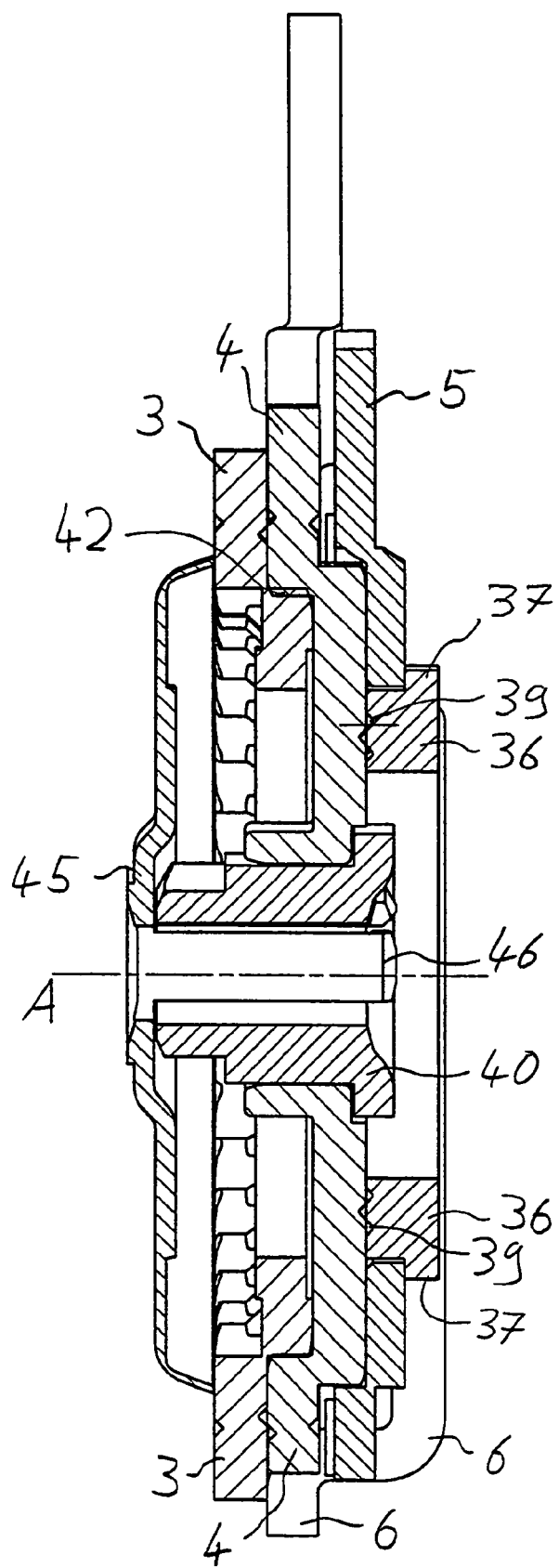
FIG. 3 a radial section through III-III of FIG. 2.

In the inclination adjuster 2, a well-known swash mechanism—shown in the section of FIG. 3—can be configured between the upper part 4 and the lower part 3, wherein an eccentric means 40 performs a tumbling movement and the upper part gearing of the upper part 4 rolls on the gearing 42 of the lower part 3. Between the gearing of the upper part 4 and the gearing 42 of the lower part 3 engaging in it, a slight toothing difference—40 to 39, for example—is formed in known fashion for creating a higher gear reduction. In principle, other inclination adjusting gearing can also be used for this purpose.

Figure 2:
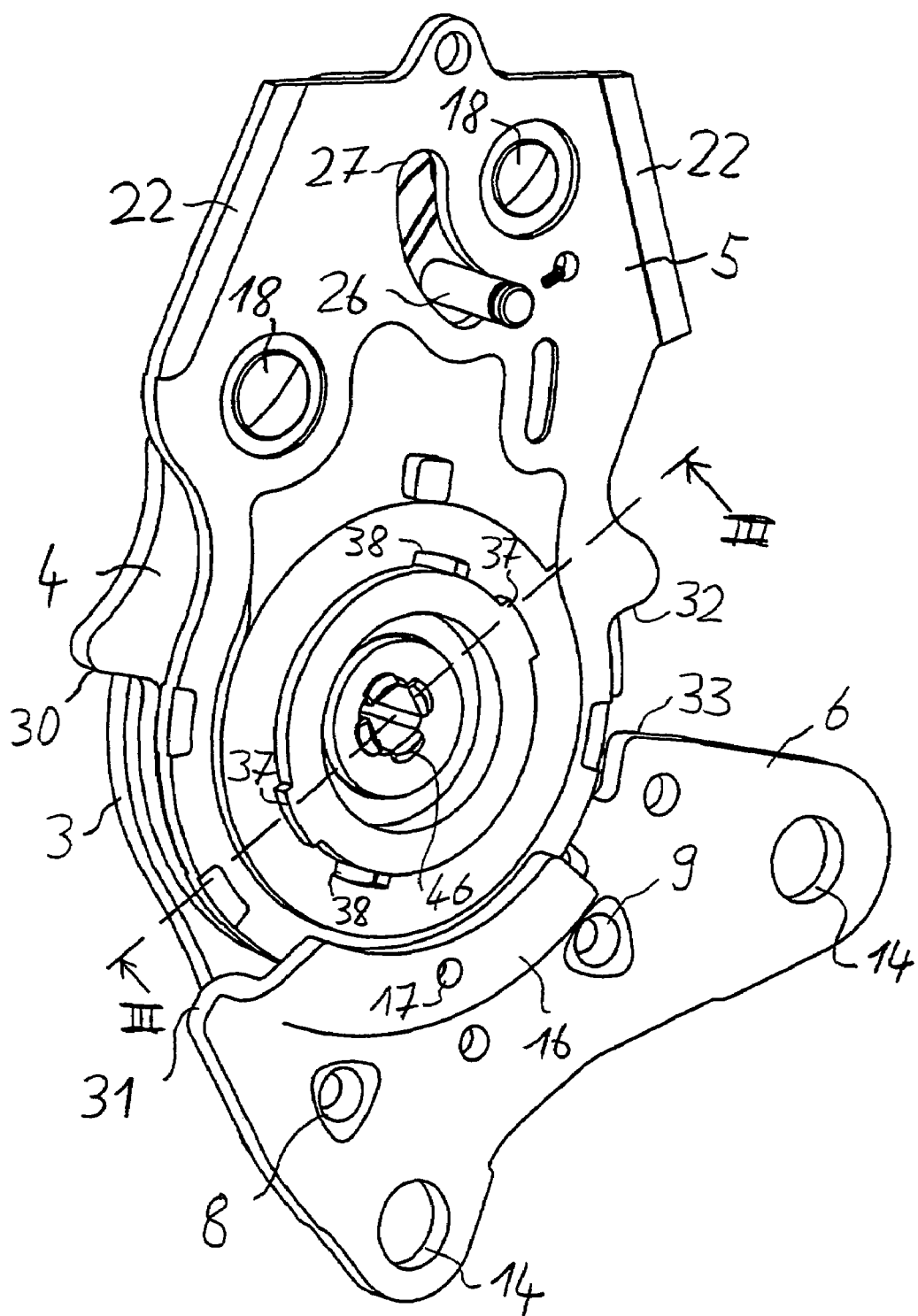
FIG. 2 represents a corresponding illustration with assembled parts and with the pivot bearing rotated counterclockwise.

At the time of assembly, the bayonet ring 36 is passed together with the bayonet spring 37 through the bayonet grooves 38 in the joint—rotary position shown in FIG. 1 and then the upper part 4 and the pivot bearing 5 are rotated counter to each other; in FIG. 2 the pivot bearing 5 is turned counterclockwise vis-à-vis the upper part. Then the weld connections 8 and 9 are formed between the lower part 3 and the adapter 6 and the boltings between the pivot bearing 5 and the bearing plate 7 by means of the bolt 18. When this is done the aforementioned seat back folding range and the inclination adjusting range are set, whereby the bayonet springs 37 and the bayonet grooves 38 can no longer pass over each other because of the fixed stops, such that the bayonet locking effects a protection against loss.

An external cover plate 45 with a plastic clip 46 extending axially through the inclination adjuster 2 is used for assembly, said plate axially holding together the inclination adjuster 2 during handling and assembly, in that it presses against the lower part 3 with the edge of the disk and with its plastic clip 46 opposes the eccentric means 40. The swivel bearing 5 is initially not secured by the cover plate 45; because the bayonet spring 37 grips behind the swivel bearing 5, the pivot bearing 5 is also axially locked, so that a secure bolt process is secured for connecting the swivel bearing 5 with the bearing plate 7.

While the invention has been described with reference to the preferred embodiment thereof, it will be appreciated by those of ordinary skill in the art that modifications can be made to the parts that comprise the invention without departing from the spirit and scope thereof.

The invention claimed is:

1. A device for adjusting inclination having a freely pivoting device for a back part of a motor vehicle seat, wherein the device for adjusting inclination has at least:
an inclination adjuster (2) with a lower part (3) and an upper part (4) that is pivotable vis-à-vis the lower part (3) within an inclination adjustment range and in its swivel positions with the lower part (3), a pivot bearing (5) for fastening to the back part of the seat, which has a control (26) for removable rotationally rigid engagement in the upper part (4) and after releasing the control (26), the back part of the seat can be folded vis-à-vis the inclination adjuster (2) within a folding range, an adapter (6) connected rotationally rigidly with the lower part (3) of the inclination adjuster (2) for fastening to a seat frame of the motor vehicle seat, and a bearing part (7) rotationally rigidly connected to the pivot bearing (5), whereby the upper part (4) of the inclination adjuster (2) is axially clamped between the pivot bearing (5) and the bearing part (7) and the pivot bearing (5) is axially clamped between the adapter (6) and the lower part (3) of the inclination adapter (2), characterized in that, the pivot bearing (5) is axially locked to the upper part (4) while remaining rotationally moveable with respect to the upper part (4) by a bayonet retention device (36, 37, 38).

2. The device for adjusting inclination according to claim 1, wherein said bayonet retention device (36) with radially projecting bayonet springs (37) is provided on the upper part (4) as the bayonet retention device and the bayonet springs (37) are provided with corresponding bayonet grooves (38) in the pivot bearing (5).

3. The device for adjusting inclination according to claim 2, wherein the positive—fitting bayonet retaining device before assembly of the inclination adjuster (2), pivot bearing (5), adapter (6) and bearing part (7) can be formed by axial stacking of the pivot bearing (5) on the inclination adjuster (2) in a joint—rotational position and subsequent rotation of the pivot bearing (5) vis-à-vis the inclination adjuster (2).

4. The device for adjusting inclination according to claim 3, wherein the joint—rotational position of the pivot bearing (5) vis-à-vis the inclination adjuster (2) lies outside of the folding range and the inclination adjustment range.

5. The device for adjusting inclination according to claim 1, wherein a folding range of the pivot bearing (5) vis-à-vis the lower part (3) and the adapter (6) and an inclination adjusting range of the upper part (4) and of the pivot bearing (5) locked with the upper part (4) vis-à-vis the lower part (3) and the adapter (6) are secured by means of stops (30, 31, 32, 33).

6. The device for adjusting inclination according to claim 1, wherein the adapter (6) has an arcuate clamping zone (16) extending axially for axial locking of the pivot bearing (5).

7. The device for adjusting inclination according to claim 1, wherein the bearing part (7) has an axially protruding, arcuate clamping zone (20) for axially locking the upper part (4).

8. The device for adjusting inclination according to claim 1, wherein the adapter (6) is welded to the lower part (3) in welded connections (8, 9).

9. The device for adjusting inclination according to claim 1, wherein the bearing part (7) is rotationally rigidly bolted to the pivot bearing (5).

10. The device for adjusting inclination according to claim 1, wherein an external cover plate (45) can be placed on the inclination adjuster (2) and can clipped in against rotation for assembly when bolting the pivot bearing (5) with the bearing part (7).

11. The device for adjusting inclination according to claim 1, wherein between the upper part (4) and the lower part (3) of the inclination adjuster (2) a swash mechanism is formed for gear reduction of a rotational movement in the lower part (3) to a pivoting movement of the upper part (4).

12. A method for assembling a device for adjusting inclination according to claim 1 having at least the following steps:

clipping in of an external cover disk (45) into the lower part (3) for axially locking the inclination adjuster (2);

placing the pivot bearing (5) on the inclination adjuster (2);

formation of bayonet retaining device (38, 37, 38) between the pivot bearing (5) and the upper part (4), fastening of the adapter (6) to the lower part (3) and fastening the pivot bearing (5) to the bearing part (7) for axial locking of the pivot bearing (5) and inclination adjuster (2) such that a bolt (18) reaching a stop (34) and a stop (32) reaching a stop (33) ensures that bayonet springs (37) can no longer pass over bayonet grooves (38).

\* \* \* \* \*